US012459339B2

(12) United States Patent
Nagliati

(10) Patent No.: US 12,459,339 B2
(45) Date of Patent: Nov. 4, 2025

(54) REMOVABLE TOP AND MOTOR VEHICLE COMPRISING SAID REMOVABLE TOP

(71) Applicant: FERRARI S.P.A., Modena (IT)

(72) Inventor: Gian Luca Nagliati, Modena (IT)

(73) Assignee: FERRARI S.P.A., Modena (IT)

( * ) Notice: Subject to any disclaimer, the term of this patent is extended or adjusted under 35 U.S.C. 154(b) by 247 days.

(21) Appl. No.: 18/171,900

(22) Filed: Feb. 21, 2023

(65) Prior Publication Data
US 2023/0264549 A1    Aug. 24, 2023

(30) Foreign Application Priority Data

Feb. 24, 2022    (IT) .................. 102022000003437

(51) Int. Cl.
| | |
|---|---|
| *B60J 7/16* | (2006.01) |
| *B60J 7/11* | (2006.01) |
| *B60J 7/185* | (2006.01) |
| *B60J 10/90* | (2016.01) |

(52) U.S. Cl.
CPC .............. *B60J 7/1635* (2013.01); *B60J 7/11* (2013.01); *B60J 7/1858* (2013.01); *B60J 10/90* (2016.02)

(58) Field of Classification Search
CPC . B60J 7/1635; B60J 7/11; B60J 7/1858; B60J 10/90
See application file for complete search history.

(56) References Cited

U.S. PATENT DOCUMENTS

| | | | |
|---|---|---|---|
| 4,120,529 A | 10/1978 | Chrysler | |
| 5,725,273 A | 3/1998 | Vernon | |
| 11,890,920 B1 * | 2/2024 | Siragusa | ................ B60J 7/1226 |
| 2016/0023545 A1 | 1/2016 | Montuori | |
| 2016/0096420 A1 * | 4/2016 | Yoshioka | ............... B60J 7/1851 |
| | | | 296/218 |
| 2018/0037097 A1 | 2/2018 | Haynes | |

FOREIGN PATENT DOCUMENTS

| | | |
|---|---|---|
| IT | BO20100147 A1 | 9/2011 |
| JP | 09164850 A * | 6/1997 |
| WO | WO-2014002570 A1 * | 1/2014 .............. B60J 10/82 |

OTHER PUBLICATIONS

Italian Search Report for Application No. 102022000003437; Filing Date—Feb. 24, 2022; Date of Mailing—Sep. 30, 2022, 8 pages.

* cited by examiner

*Primary Examiner* — Daniel J Colilla

(74) *Attorney, Agent, or Firm* — CANTOR COLBURN LLP

(57) ABSTRACT

A removable top for a motor vehicle is described, comprising a fabric cover, which can be coupled to a body of the motor vehicle, a coupling element designed to be interposed between said cover and said body; the coupling element comprises, in turn: a support designed to engage a compartment defined by said body; and a first gasket defining a first peripheral edge of the coupling element, on which the cover can be arranged so as to abut against it, a second peripheral edge opposite said first edge;

the first gasket delimiting a first convex region of the support; the second peripheral edge further comprises at least one first segment (47) delimiting at least one second convex region of said support.

9 Claims, 4 Drawing Sheets

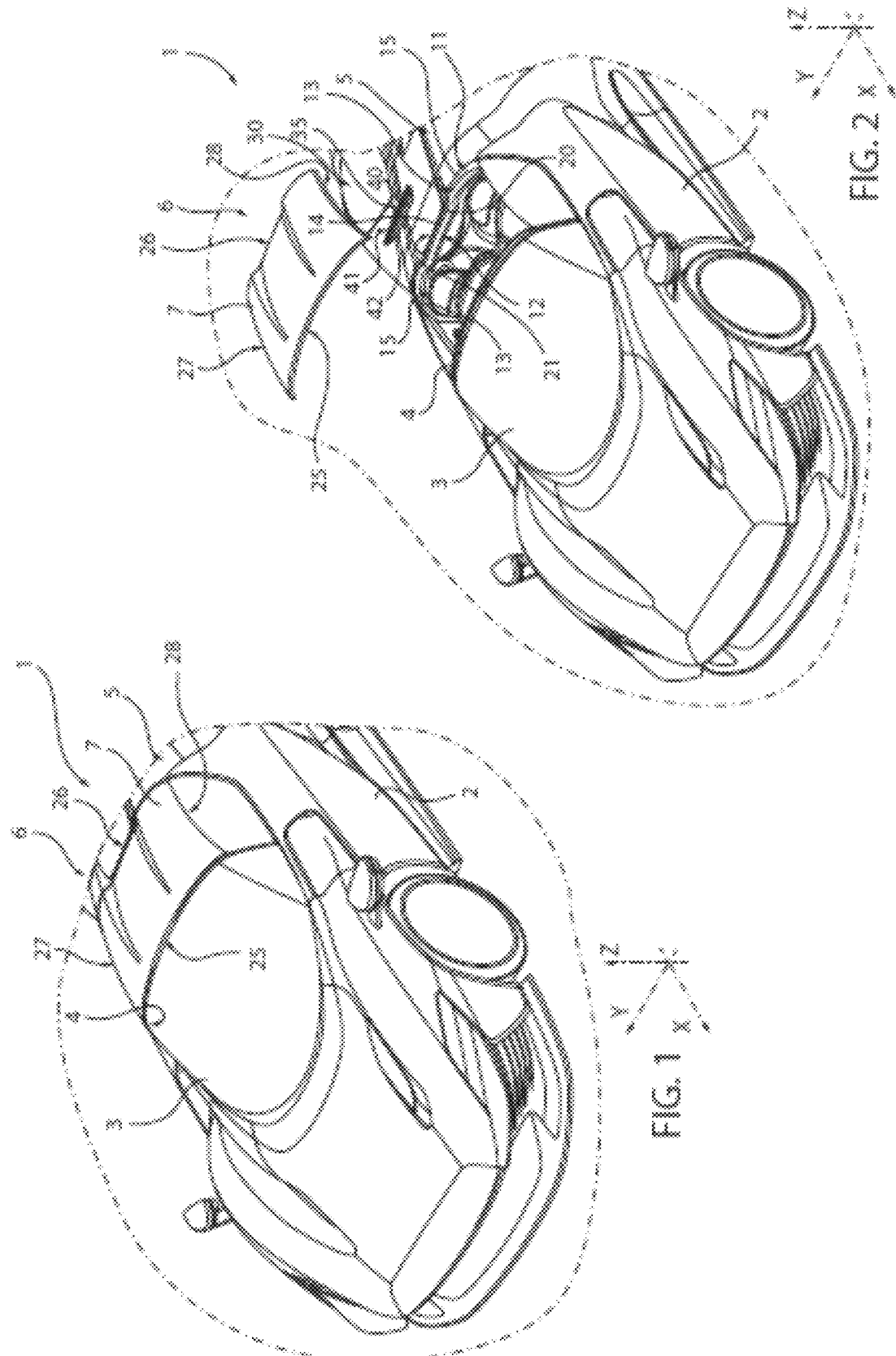

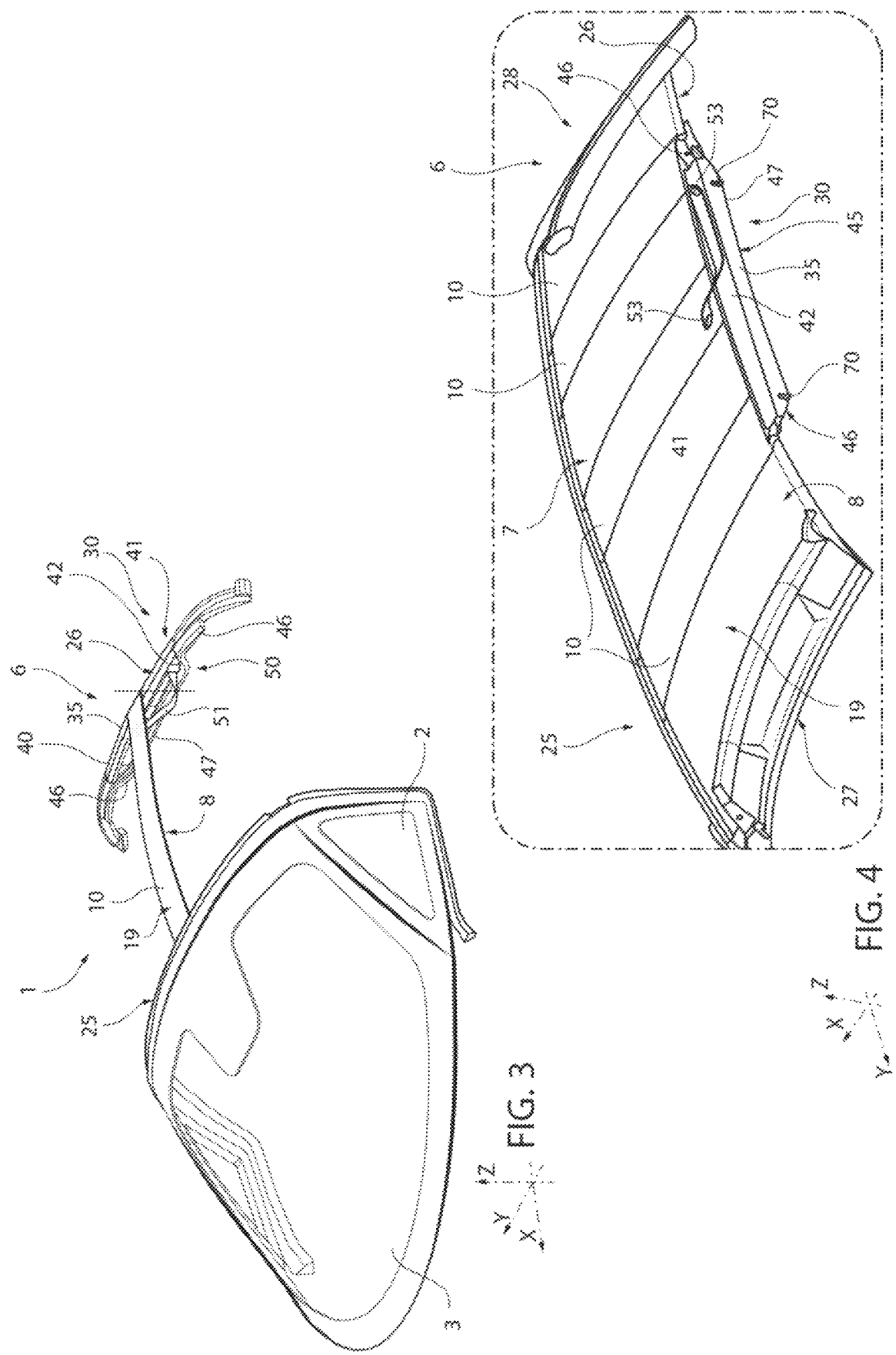

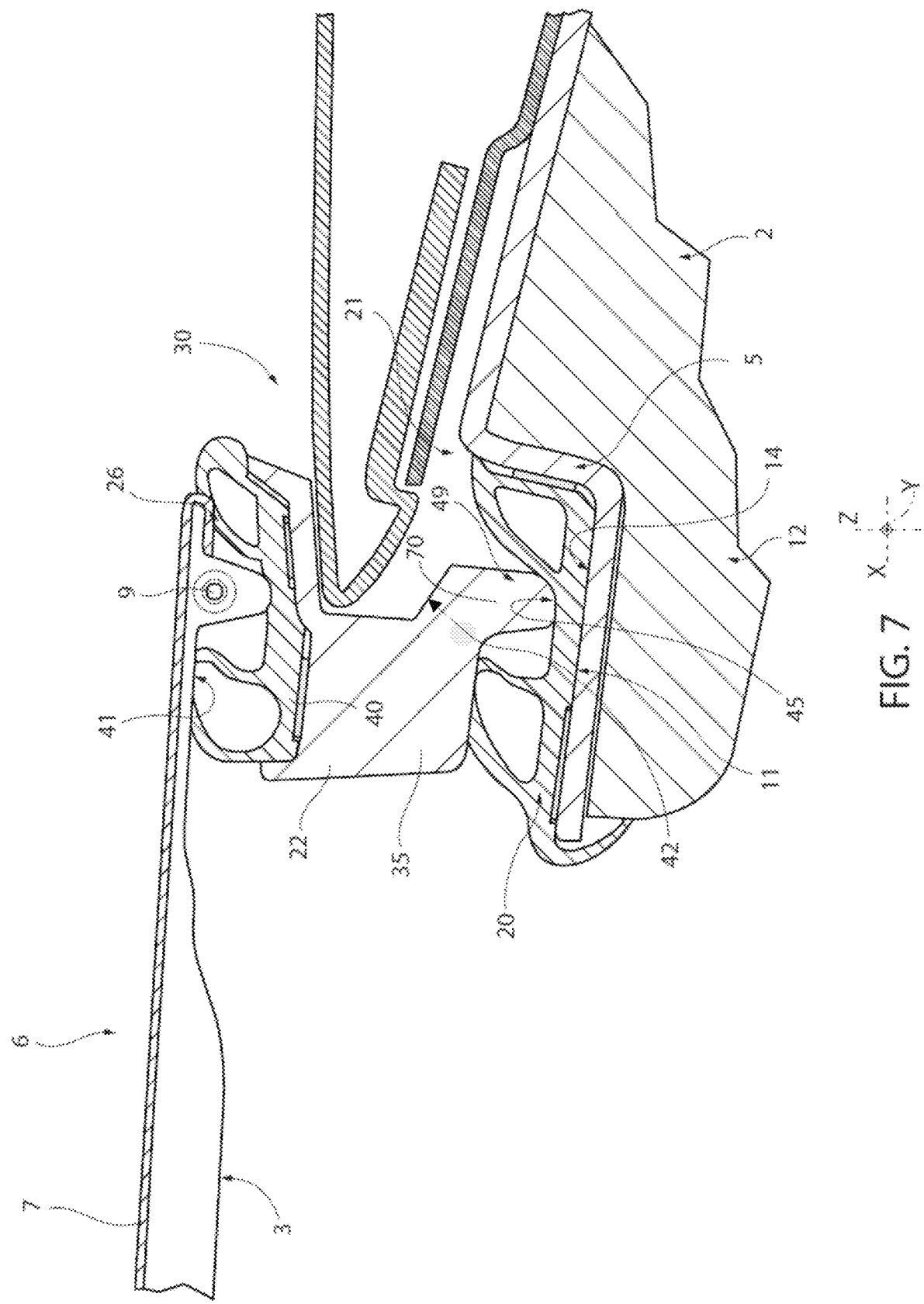

REMOVABLE TOP AND MOTOR VEHICLE COMPRISING SAID REMOVABLE TOP

CROSS-REFERENCE TO RELATED APPLICATIONS

This patent application claims priority from Italian patent application no. 102022000003437 filed on Feb. 24, 2022, the entire disclosure of which is incorporated herein by reference.

TECHNICAL FIELD

This invention relates to a removable top and a motor vehicle comprising this removable top.

BACKGROUND

Motor vehicles comprising a body and a fabric top, in particular an emergency top, are known.

The body defines a passenger compartment delimited, with reference to the motor vehicle's normal direction of travel, in front of a windshield and behind a backrest.

The fabric top may be selectively removed from the body or be arranged to abut against an upper edge of the backrest so as to close the body above.

More specifically, the motor vehicle comprises a gasket covering the above-mentioned upper edge and insulates the passenger compartment in a fluid-tight manner when the fabric top closes the body above.

The fabric top is formed from a covering made of flexible material, a support frame of the covering, and a tensioning cable extending laterally to the motor vehicle's direction of travel.

The covering is made of a flexible material and basically is not able to react to compression forces, but only to assume a desired shape under a traction force.

As a result, the tensioning cable needs to assume a taut, arched shape with a concavity facing downwards and not straight so that the covering can assume the desired shape.

For this reason, the rear edge of the fabric top must, necessarily, assume a concave shape enabling the cable to assume the arched shape with the concavity facing downwards.

For the purpose of meeting this requirement, it is known to shape the upper edge of the backrest in a concave way and, thus, of the body or insert a peripheral frame with an upper, concave edge between the backrest and the gasket.

There is a need in the sector to have maximum geometric flexibility in relation to the shape of the above-mentioned upper edge, without requiring the use of an additional, peripheral frame.

SUMMARY

The purpose of this invention is to produce a removable top, which makes it possible to meet the need mentioned above.

The above-mentioned purpose is achieved with this invention, as it relates to a removable top according to what is defined in claim 1.

BRIEF DESCRIPTION OF THE DRAWINGS

In order to better understand this invention, a non-limiting preferred embodiment thereof will now be described by way of example with reference to the accompanying drawings, in which:

FIG. 1 is a perspective view of a motor vehicle comprising a removable top produced according to the precepts of this invention and arranged in a first configuration in which it closes the body above;

FIG. 2 is a perspective view of the motor vehicle in FIG. 1 with the removable top arranged in a second configuration wherein it is removed from the body;

FIG. 3 illustrates, in perspective view and on a greatly enlarged scale, the motor vehicle and the removable top in FIGS. 1 and 2, with parts removed for clarity;

FIG. 4 illustrates, in perspective view and on an even more enlarged scale, the top in FIG. 3;

FIG. 7 is a cross-section along the line VII-VII in FIG. 6 on an enlarged scale and with parts removed for clarity.

DESCRIPTION OF EMBODIMENTS

Figure 5:
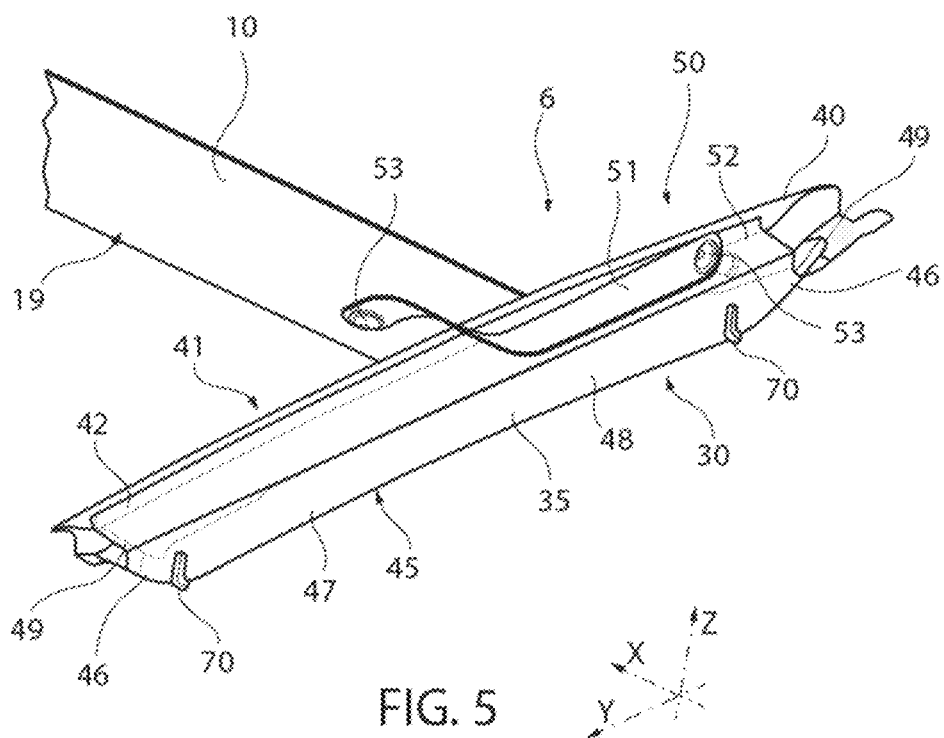
FIG. 5 shows some details of the removable top in FIG. 4, with parts removed for clarity and according to a first visual angle.

With reference to the attached figures, reference number 1 indicates a motor vehicle comprising a body 2 and a removable top 6.

The motor vehicle 1 is, in the case illustrated, a motor vehicle of the license plate category.

The top 6 is, in the illustrated case, an emergency top.

It should be specified that, below in this description, expressions such as "above", "below", "in front of", "behind" and the like are used with reference to the normal movement of the motor vehicle 1.

It should also be specified that, below in this description, the expression "concave" ("convex") region is used to indicate a two-dimensional or three-dimensional region shaped so that at least one segment exists (or none exist) joining two points of the region that does not entirely belong to the same region.

It should, finally, be specified that below in this description the expression segment with an upwards ("downwards") concavity is used to indicate a segment or a single-dimensional curve shaped so as to be located above (below) any tangent to the segment or curve itself.

More specifically, the body 2 defines a passenger compartment 3.

The passenger compartment 3 is delimited at the front by a windshield 4 and behind by a backrest 5.

It is also possible to define:

a longitudinal axis X integral with the motor vehicle 1, arranged, in use, horizontal and parallel to a normal direction of travel of the motor vehicle 1;

a transverse axis Y integral with the motor vehicle 1, arranged, in use, horizontal and orthogonal to the axis X; and an axis Z integral with the motor vehicle 1, arranged, in use, vertical and orthogonal to the axes X, Y.

The removable top 6 may be selectively arranged:

in a first operating configuration (FIG. 1) wherein it cooperates with the body 2 and covers the passenger compartment 3 above; and in a second operating configuration (FIG. 2) wherein it is removed from the body 2 and housed in a suitable housing of the motor vehicle 1, and leaves the passenger compartment 1 free above.

More specifically, the top 6 comprises:

a cover 7 made of fabric;

a chassis 8 designed to support the cover 7; and a tensioning cable 9 coupled to the cover 7.

The cover 7 is delimited by:
- a pair of, respectively, front and back edges 25, 26; and
- a pair of side edges 27, 28 extending between respective opposite ends between them of the other edges 25, 26.

The front and back edges 25, 26 are opposite each other, shaped like arches and have respective extension directions that are parallel to each other and the axis Y.

The edges 27, 28 are opposite each other, shaped like arches and have respective extension directions parallel to each other and the axis X.

The edges 25, 26, 27, 28 have concavities facing downwards.

The cable 9 is arranged at the edge 26 (FIG. 7).

The chassis 8 comprises multiple centrings 10 extending parallel to the axis X and spaced apart along the axis Y (FIG. 4).

The cable 9 extends along the axis Y of the motor vehicle 1.

The cover 7 has negligible compression stiffness and is only able to be inflected to assume a desired shape.

The inflection of the cover 7 according to a desired form is obtained by tensioning the cable 9.

More specifically, the cable 9 has an arched shape with a concavity facing, in use, downwards when the cover 7 assumes the desired shape.

The backrest 5 is delimited above by a peripheral edge 11.

The peripheral edge 11 delimits a compartment 21 open above, when the top 6 is arranged in the first configuration. The backrest 5 comprises, in addition:
- a concave region 12 delimited above by the peripheral edge 11; and
- a pair of convex regions 13, also delimited by the peripheral edge 11.

The peripheral edge 11 comprises, in turn:
- a segment 14 delimiting the region 12; and
- a pair of segments 15 delimiting the respective regions 13.

The segment 14 is interposed between the segments 15 along the axis Y.

The segments 15 are connected to the segment 14.

Each segment 14 comprises, in turn:
- a pair of end portions 16; and
- a portion 17 interposed between the portions 16 and arranged below the portions 16.

The peripheral edge 11 comprises a pair of inflections 18 arranged at the connections between the portion 17.

The portion 16 has a concavity facing downwards and the portions 17 have respective concavities facing upwards.

The segment 15 has a concavity facing downwards.

The motor vehicle 1 comprises, in addition, a gasket 20 applied at least in part on the peripheral edge 11 and included to insulate the passenger compartment 3 in a fluid-tight manner when the top 6 is in the first configuration.

More precisely, the gasket 20 comprises (FIG. 6):
- a pair of segments 23 applied to the respective segments 15 of the peripheral edge 11; and
- a segment 22 interposed along the direction Y between the segments 23 and applied to the segment 14 of the peripheral edge 11.

The segments 22, 23 of the gasket 20 have a shape corresponding to the respective segments 14, 15 of the peripheral edge 11.

Figure 6:
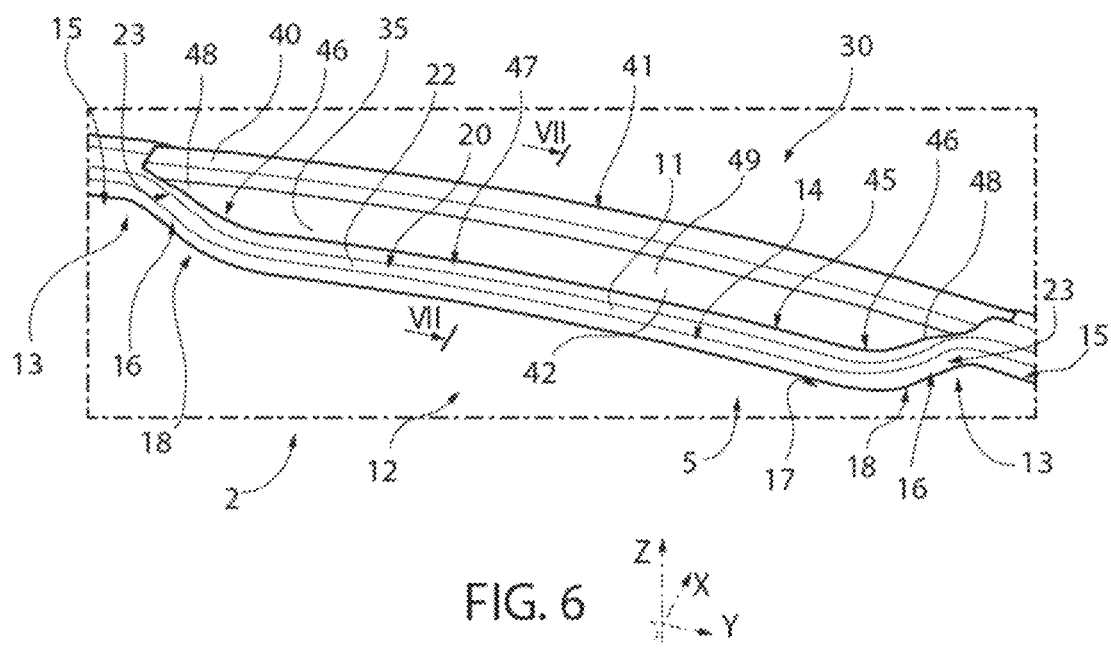
FIG. 6 illustrates, in perspective view, some details of FIG. 5 according to a second visual angle.

Advantageously, the top 6 comprises, in addition, a coupling element 30 interposed between the cover 7 and the body 2 when the top 6 is arranged in the first configuration; the coupling element 30 comprises, in turn:
- a support 35 engaging the compartment 21 defined by the body 2, when the top 6 is arranged in the first configuration;
- a gasket 40 defining a peripheral edge 41 of the coupling element 30 and against which the cover 7 is arranged to abut, when the top 6 is arranged in the first configuration; and
- a peripheral edge 45 opposite said peripheral edge 41;
- the peripheral edge 41 delimits a convex region 42 of said support 35;
- the peripheral edge 45 comprises, in addition, a pair of segments 46 and one segment 47 delimiting, respectively, a pair of concave regions 48 and a convex region 49 of said support 35 (FIGS. 4 and 6).

In particular, the coupling element 30 is removed from the body 2 when the top 6 is arranged in the second configuration.

The peripheral edge 45 is arranged to abut against the gasket 20 and has a shape corresponding to the gasket 20.

In particular, the segments 46 are applied to respective segments 23 of the gasket 20, and the segment 47 is interposed along the direction Y between the segments 46 and applied to the segment 22 of the gasket 20.

The segments 46 have a concavity facing downwards and the segment 47 has concavities facing upwards. The edge 26 of the cover 7 is arranged to abut against the gasket 40 of the coupling element 30 when the top 6 is in the first configuration of FIG. 1.

The convex regions 49 of the support 35 are coupled with the respective regions 13 of the backrest 5 and the region 49 of the support 35 engages the region 12 of the backrest 5, when the top 6 is in the first configuration (FIG. 6).

The top 6 comprises, in addition, connection means 50 designed to connect the coupling element 30 and the cover 7.

More specifically, the connection means 50 are flexible and comprise a cable 51.

The cable 51 is fixed to the support 35 and to a lower surface 19 of a centring 10 (FIGS. 3 and 5).

More precisely, the cable 51 has a pair of end seats 52 engaged by respective buttons 53 fixed to the support 35 and to the surface 19 of the centring 10.

The coupling element 30 comprises, in addition, multiple pins 70 having respective axes parallel to the axis Z and engaging respective seats 71 (not shown) defined by the gasket 20, when the top 6 is in the first configuration. In this way, it is possible to centre the coupling element 30 on the body 2.

With reference to FIGS. 4 and 5, the pins 70 project, overhanging, below from the support 35.

In the case illustrated, the support 35 is made of self-skinning polyurethane.

The operation of the removable top 6 is illustrated starting from a condition in which the removable top 6 is arranged in the first configuration and fixed to the body 2 (FIG. 1).

In this condition, the coupling element 30 is fixed to the gasket 20 by coupling the pins 70 in the seats (not shown).

The cover 7 is connected to the coupling element 30 via the cable 51 and is arranged with the corresponding edge 26 abutting against the gasket 40 of the coupling element 30.

Since the gasket 40 delimits the convex region 42 of the support 35, the cable 9 of the cover 7 takes on the correct, arched shape with the concavity facing downwards enabling the correct tensioning of the cover 7.

The gasket 40 makes it possible to insulate the passenger compartment 3 in a fluid-tight manner from the outside of the motor vehicle 1.

In order to remove the top 6 and arrange it in the second configuration of FIG. 2, the cover 7 is moved away from the gasket 40 and the support 35 of the coupling element 30 is removed from the gasket 20 freeing the pins 70 from the corresponding seats (not shown).

The cable 51 prevents the user from forgetting to remove the coupling element 30, once the cover 7 is removed.

At this point, the top 6 may be housed in a suitable compartment of the motor vehicle 1.

The advantages enabled by the removable top 6 according to this invention will be apparent from an examination thereof.

More specifically, the coupling element 30 of the top 6 comprises the support 35 and the gasket 40.

The segments 46, 47 of the peripheral edge 45 of the support 35 define corresponding concave and convex regions 48, 49 of the support 35 that are coupled with corresponding convex and concave regions 13, 12 of the backrest 5.

The gasket 40 delimits the convex region 42 of the support 35 and the edge 26 of the cover 7 is arranged abutting against it when the top 6 is in the first position.

In this way, it is possible to keep the cable 9 tensioned and, thus, arrange in the desired form the cover 7, including in the presence of a backrest 5 provided with a concave region 12, without requiring the use of peripheral frames.

In other words, the coupling element 30 makes it possible to couple covers 7 made of fabric to the backrest 5 of any shape, even partially concave, meaning the designer has more freedom.

The cable 51 connects the coupling element 30 and a centring 10 of the cover 7. In this way, you avoid the user's forgetting the coupling element 30 abutting against the gasket 40 once the cover 7 has been removed.

The pins 70 are coupled with the seat (not shown), enabling the centring of the coupling element 30 on the gasket 20.

Finally, it is clear that changes may be made to the removable top 6, and variations produced thereto, according to this invention that, in any case, do not depart from the scope of protection defined by the claims.

In particular, the peripheral edge 45 could comprise just the segment 47 delimiting the sole region 49 or the segment 47 and just one other segment 46.

The invention claimed is:

1. A motor vehicle (1) comprising:
a body (2) defining a compartment (21);
a removable top (6); said removable top (6) comprising, in turn:
a fabric cover (7), which can be coupled to said body (2) of said motor vehicle (1);
at least one centring (10) designed to support said fabric cover (7); and
a coupling element (30) interposed between said cover (7) and said body (2);
said coupling element (30) comprising, in turn:
a support (35) designed to engage said compartment (21) defined by said body (2);
a first gasket (40) defining a first peripheral edge (41) of said coupling element (30), on which said cover (7) can be arranged, in use, so as to abut against the first gasket;
connection means (50) interposed between said coupling element (30) and said fabric cover (7) and connected to said centring (10) and to said support (35); and
a second peripheral edge (45) opposite said first edge (41);
said first gasket (40) delimiting a first convex region (42) of said support (35);
said second peripheral edge (45) further comprising at least one first segment (47) delimiting, in use, at least one second convex-concave region (48) of said support (35);
wherein said top (6) is selectively available in:
a first configuration wherein said support (35) engages said compartment (21) and said cover (7) is abutted against said first peripheral edge (41); and
a second configuration wherein said support (35) it is removed from said body (2).

2. The motor vehicle according to claim 1, characterized in that said second peripheral edge (45) further comprises a second segment (46) delimiting, in use, at least one third convex region (49) of said support (35).

3. The motor vehicle according to claim 1, characterized in that said connection means (50) comprise a flexible cable (51).

4. The motor vehicle according to claim 1, characterized in that said coupling element (30) comprises a plurality of centring pins (70) to centre, in use, said coupling element (30) relative to said compartment (21).

5. The motor vehicle according to claim 1, characterized in that said support (35) is made of self-skinning polyurethane.

6. The motor vehicle (1) according to claim 1, comprising:
a third peripheral edge (11) delimiting said compartment (21);
a second gasket (20) carried by said third peripheral edge (11);
said third peripheral edge (11) comprising, in turn, at least one third segment (14) delimiting an additional concave region (12) of said body (2);
said second convex region (48) of said coupling element (30) being at least partly housed inside said additional concave region (12) of said body (2), when said top (6) is arranged, in use, in said first configuration.

7. The motor vehicle according to claim 6, characterized in that said third peripheral edge (11) further comprises at least a fourth segment (15) delimiting a fifth convex region (13) of said body (2).

8. The motor vehicle according to claim 6, characterized in that said support (35) abuts against said second gasket (20), when said top (6) is arranged, in use, in said first configuration.

9. The motor vehicle according to claim 1, wherein said coupling element (30) is removed from said body (2) when said removable top (6) is arranged in said second configuration.

* * * * *